United States Patent
Marathe et al.

(10) Patent No.: US 12,530,630 B2
(45) Date of Patent: Jan. 20, 2026

(54) HIERARCHICAL GRADIENT AVERAGING FOR ENFORCING SUBJECT LEVEL PRIVACY

(71) Applicant: Oracle International Corporation, Redwood City, CA (US)

(72) Inventors: Virendra J. Marathe, Florence, MA (US); Pallika Haridas Kanani, Westford, MA (US)

(73) Assignee: Oracle International Corporation, Redwood City, CA (US)

( * ) Notice: Subject to any disclaimer, the term of this patent is extended or adjusted under 35 U.S.C. 154(b) by 875 days.

(21) Appl. No.: 17/805,674

(22) Filed: Jun. 6, 2022

(65) Prior Publication Data
US 2023/0394374 A1    Dec. 7, 2023

(51) Int. Cl.
*G06N 20/20* (2019.01)
*G06F 21/62* (2013.01)

(52) U.S. Cl.
CPC ......... *G06N 20/20* (2019.01); *G06F 21/6245* (2013.01)

(58) Field of Classification Search
CPC ............................. G06N 20/20; G06F 21/6245
USPC .......................................................... 706/12
See application file for complete search history.

(56) References Cited

U.S. PATENT DOCUMENTS

| | | |
|---|---|---|
| 2022/0083911 A1 | 3/2022 | Flanagan et al. |
| 2023/0351042 A1* | 11/2023 | De .................. G06N 3/084 |

FOREIGN PATENT DOCUMENTS

| | | | |
|---|---|---|---|
| CN | 116150622 A | * 5/2023 | ............. G06N 20/00 |
| CN | 117640253 A | * 3/2024 | ........... G06N 3/0464 |

OTHER PUBLICATIONS https://pair-code.github.io/saliency/#home as archived Apr. 18, 2022 (Year: 2022).*
Advances and Open Problems in Federated Learning, Kairouz et al, Mar. 9, 2021 (Year: 2021).*
Federated Machine Learning: Concept and Applications by Yang et al , 2019 (Year: 2019).*
Abadi, M., Chu, A., Goodfellow, I., McMahan, H. B., Mironov, I., Talwar, K., and Zhang, L., "Deep learning with differential privacy," In Proceedings of the 2016 ACM SIGSAC Conference on Computer and Communications Security, pp. 308-318, 2016 (https://arxiv.org/abs/1607.00133).

(Continued)

*Primary Examiner* — Austin Hicks
(74) *Attorney, Agent, or Firm* — S. Scott Foster; Kowert, Hood, Munyon, Rankin & Goetzel, P.C.

(57) ABSTRACT

Hierarchical gradient averaging is performed as part of training a machine learning model to enforce subject level privacy. A sample of data items from a training data set is identified and respective gradients for the data items are determined. The gradients are then clipped. Each subject's clipped gradients in the sample are averaged. A noise value is added to a sum of the averaged gradients of each of the subjects in the sample. An average gradient for the entire sample is determined from the averaged gradients of the individual subjects with the added noise value. This average gradient for the entire sample is used for determining machine learning model updates.

20 Claims, 6 Drawing Sheets

(56) References Cited

OTHER PUBLICATIONS

Bonawitz, K., Eichner, H., Grieskamp, W., Huba, D., Ingerman, A., Ivanov, V., Kiddon, C., Konecny, J., Mazzocchi, S., McMahan, H. B., Overveldt, T. V., Petrou, D., Ramage, D., and Roselander, J., "Towards federated learning at scale: System design,". Proceedings of the 2nd SysML Conference, Palo Alto, CA, USA, CoRR, abs/1902.01046, 2019, pp. 1-15.

Caldas, S., Wu, P., Li, T., Konecny, J., McMahan, H. B., Smith, V., and Talwalkar, A., "LEAF: A benchmark for federated settings," CoRR, abs/1812.01097, 2018. URL http://arxiv.org/abs/1812.01097, pp. 1-9.

Carlini, N., Liu, C., Erlingsson, U'., Kos, J., and Song, D., "The secret sharer: Evaluating and testing unintended memorization in neural networks," In 28th USENIX Security Symposium, pp. 267-284, 2019.

Duchi, J. C., Jordan, M. I., and Wainwright, M. J., "Local privacy and statistical minimax rates," Published in: 2013 IEEE 54th Annual Symposium on Foundations of Computer Science, pp. 1-10.

Dwork, C. and Roth, A., "The algorithmic foundations of differential privacy," Foundations and Trends in Theoretical Computer Science, 9(3–4): pp. 211-407, Aug. 2014.

Dwork, C., McSherry, F., Nissim, K., and Smith, A., "Calibrating noise to sensitivity in private data analysis," In Proceedings of the Third Conference on Theory of Cryptography, TCC'06, pp. 265-284, 2006.

Dwork, C., Rothblum, G. N., and Vadhan, S. P., "Boosting and differential privacy," In 51st Annual IEEE Symposium on Foundations of Computer Science, FOCS, pp. 51-60, 2010.

Hardy, S., Henecka, W., Ivey-Law, H., Nock, R., Patrini, G., Smith, G., and Thorne, B., "Private federated learning on vertically partitioned data via entity resolution and additively homomorphic encryption" CoRR, abs/1711.10677, 2017. URL http://arxiv.org/ abs/1711.10677, pp. 1-60.

Kairouz, P., et al., "Advances and open problems in federated learning," Foundations and Trends® in Machine Learning, vol. 14, Issue 1-2, CoRR, abs/1912.04977, 2019. URL http://arxiv.org/abs/1912.04977, pp. 1-121.

Kasiviswanathan, S. P., Lee, H. K., Nissim, K., Raskhodnikova, S., and Smith, A. D., "What can we learn privately?," CoRR, abs/0803.0924, 2008. URL http: //arxiv.org/abs/0803.0924, pp. 1-29.

Konecny, J., McMahan, B., and Ramage, D., "Federated optimization: Distributed optimization beyond the datacenter," CoRR, abs/1511.03575, 2015. URL http: //arxiv.org/abs/1511.03575, pp. 1-5.

Levy, D., Sun, Z., Amin, K., Kale, S., Kulesza, A., Mohri, M., and Suresh, A. T., "Learning with user-level privacy," Part of Advances in Neural Information Processing Systems 34 (NeurIPS 2021), CoRR, abs/2102.11845, 2021. URL https: //arxiv.org/abs/2102.11845, pp. 1-43.

Liu, Y., Suresh, A. T., Yu, F. X., Kumar, S., and Riley, M., "Learning discrete distributions: user vs item-level privacy," 34th Conference on Neural Information Processing Systems (NeurIPS 2020), Vancouver, Canada (NeurIPS 2020), CoRR, abs/2007.13660, 2020, pp. 1-31.

McMahan, H. B., Ramage, D., Talwar, K., and Zhang, L., "Learning differentially private recurrent language models," In 6th International Conference on Learning Representations, ICLR 2018, https://arxiv.org/abs/1710.06963, 2018, pp. 1-14.

McSherry, F., "Privacy integrated queries: an extensible platform for privacy-preserving data analysis," In Proceedings of the ACM SIGMOD International Conference on Management of Data, pp. 19-30, 2009.

Melis, L., Song, C., Cristofaro, E. D., and Shmatikov, V., "Inference attacks against collaborative learning," CoRR, abs/1805.04049, 2018. URL http://arxiv.org/ abs/1805.04049, pp. 1-14.

Mironov, I., "Renyi Differential Privacy," Published in: 2017 IEEE 30th Computer Security Foundations Symposium (CSF), CoRR, abs/1702.07476, 2017. URL http://arxiv.org/ abs/1702.07476, pp. 1-13.

* cited by examiner

HIERARCHICAL GRADIENT AVERAGING FOR ENFORCING SUBJECT LEVEL PRIVACY

BACKGROUND

Machine learning models provide important decision making features for various applications across a wide variety of fields. Given their ubquity, greater importance has been placed on understanding the implications of machine learning model design and training data set choices on machine learning model performance. Systems and techniques that can provide greater adoption of machine learning models are, therefore, highly desirable.

SUMMARY

Techniques for hierarchical gradient averaging for enforcing subject level privacy are described. Training data sets for a machine learning model may include data items associated with different subjects. To enforce subject-level privacy with respect to the different subjects, training of the machine learning model may include adjustments the gradients determined as part of training the machine learning model that include added noise. A sample of data items from a training data set is identified and respective gradients for the data items are determined. The gradients are then clipped. Each subject's clipped gradients in the sample are averaged. A noise value is added to the averaged gradients of each of the subjects in the sample. An average gradient for the entire sample is determined from the averaged gradients of the individual subjects. This average gradient for the entire sample is used for determining machine learning model updates.

Figure 1:
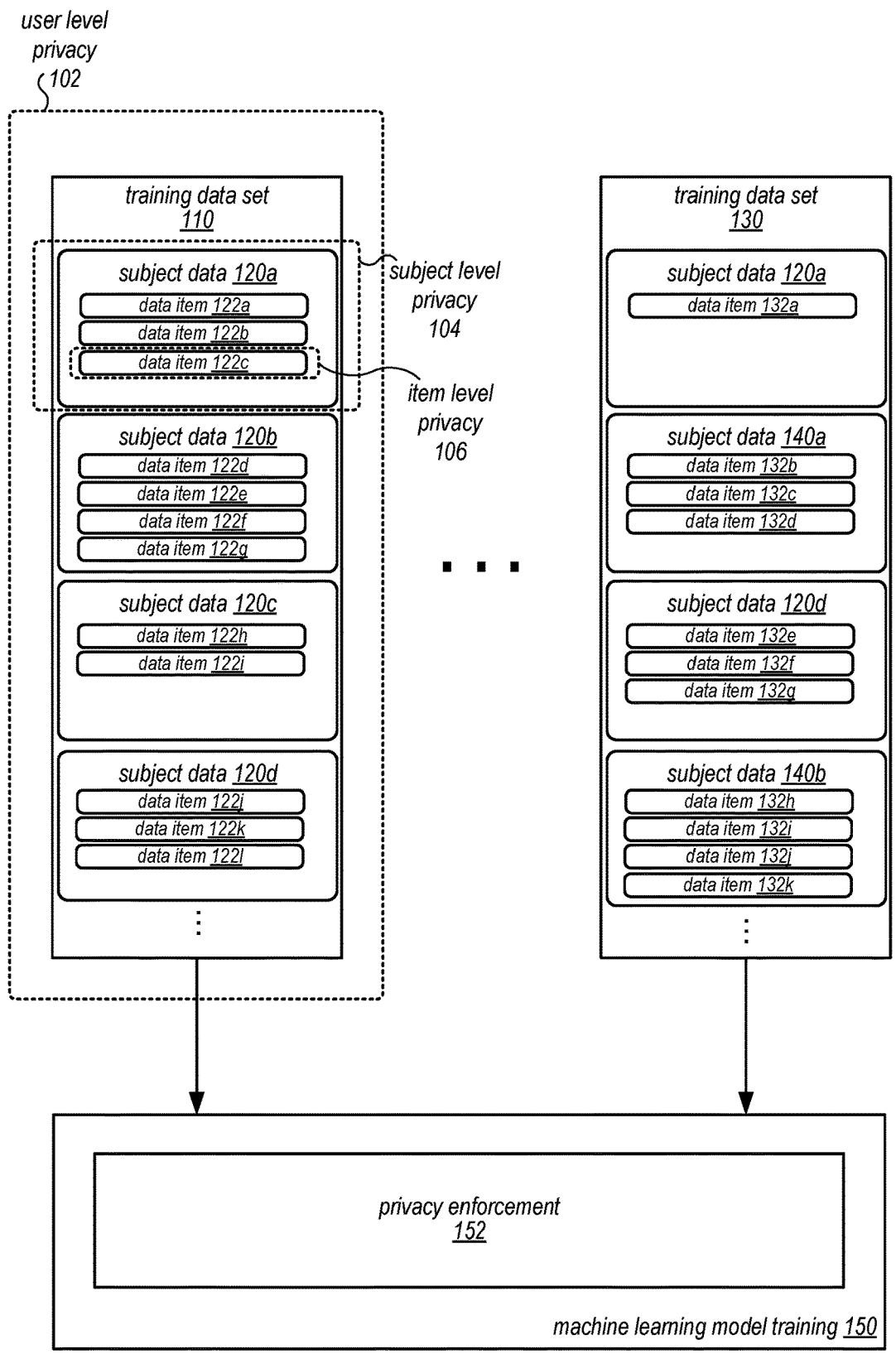
FIG. 1 is a logical block diagram illustrating subject-level privacy enforcement as part of a machine learning model training system, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for hierarchical gradient averaging for enforcing subject level privacy are described herein. Machine learning models are trained using training data sets. These data sets may include various data items (e.g., database records, images, documents, etc.) upon which different training techniques may be performed to generate a machine learning model that can generate an inference (sometimes referred to as a prediction). Because machine learning models "learn" from the training data sets, it may be possible to discover characteristics of the training data sets, including actual values of the training data sets, through various techniques (e.g., by submitting requests for inferences using input data similar to actual data items of a training data set to detect the presence of those actual data items). This vulnerability may deter or prevent the use of machine learning models in different scenarios. Therefore, techniques that can minimize this vulnerability may be highly desirable, increasing the adoption of machine learning models in scenarios where the use of those machine learning models can improve the performance (or increase the capabilities) of various systems, services, or applications that utilize machine learning models to perform different tasks.

Federated learning is one example where techniques to prevent loss of privacy from training data sets for machine learning models, as discussed above, can be beneficial. Federated learning is a distributed training paradigm that lets different organizations, entities parties, or other users collaborate with each other to jointly train a machine learning model. In the process, the users do not share their private training data with any other users. Federated learning may provide the benefit of the aggregate training data across all its users, which typically leads to much better performing models.

Federated learning may automatically provide some training data set privacy, as the data never leaves an individual user's control (e.g., the device or system that performs training for that user). However, as machine learning models are known to learn the training data itself, which can leak out at inference time. Differential privacy provides a compelling solution to the data leakage problem. Informally, a differentially private version of an algorithm A introduces enough randomization in A that makes it harder for an adversary to determine if any specific data item was used as an input to A. For machine learning models, differential privacy may be used to ensure that an adversary cannot reliably determine if a specific data item was a part of the training data set.

For machine learning model training, differential privacy is introduced in the model by adding carefully calibrated noise during training. In the federated learning setting, this noise may be calibrated to hide either the use of any data item, sometimes referred to as item level privacy, or the participation of any user, sometimes referred to as user level privacy, in the training process. User level privacy may be understood to be a stronger privacy guarantee than item level privacy since the former hides use of all data of each user whereas the latter may leak the user's data distribution even if it individually protects each data item.

Item level privacy or user level privacy may provide beneficial privacy protection in some scenarios (e.g., cross-device federated learning consisting of millions of hand held cell phones, where, for instance, a user may be an individual with data that typically resides in one device, such as a mobile phone, that participates in a federation and one device typically only contains one individual's data). However, the cross-silo federated learning setting, where users are organizations that are themselves gatekeepers of data items of numerous individuals (which may be referred to "as subjects"), offer much richer mappings between subjects and their personal data.

Consider the following example. An online retail store customer C. C's online purchase history is highly sensitive, and should be kept private. C's purchase history contains a multitude of orders placed by C in the past. Furthermore, C may be a customer at other online retail stores. Thus, C's aggregate private data may be distributed across several online retail stores. These retail stores could end up collaborating with each other in a federation to train a model using their customers', including C's, private purchase histories.

Item level privacy does not suffice to protect the privacy of C's data. That is because item level privacy simply obfuscates participation of individual data items in the training process. Since a subject may have multiple data items in the data set, item level private training may still leak a subject's data distribution. User level privacy also does not protect the privacy of C's data either. User level privacy obfuscates each user's participation in training. However, a subject's data can be distributed among several users, and it can be leaked when aggregated through federated learning. In the worst case, multiple federation users may host only the data of a single subject. Thus C's data distribution can be leaked even if individual user's participation is obfuscated.

FIG. 1 is a logical block diagram illustrating subject level privacy enforcement as part of a machine learning model training system, according to some embodiments. Training data set 110 may illustrate the various privacy levels which can be protected, in some embodiments. For example, within training data set 110 are various data items 122*a*, 122*b*, 122*c*, 122*d*, 122*e*, 122*f*, 122*g*, 122*h*, 122*i*, 122*j*, 122*k*, and 122*l*. Each of these data items may be associated with a subject. Thus, as illustrated in FIG. 1, subject data 120*a* includes data items 122*a*, 122*b*, and 122*c*, subject data 120*b* includes data items 122*d*, 122*e*, 122*f*, and 122*g*, subject data 120*c* includes data items 122*h* and 122*i*, and subject data 120*d* includes data items 122*j*, 122*k*, and 122*l*. Different privacy types are indicated in FIG. 1. User level privacy 102 is enforced for training data set 110, subject level privacy 104 is enforced respectively for each subject's data (e.g., subject data 120*a*), and item level privacy 106 is enforced respectively for individual data items (e.g., data item 122*c*).

As noted above, a subject's data can be spread across multiple training data sets, like training data set 130. For example, training data set 130 may include data items 132*a*, 132*b*, 132*c*, 132*d*, 132*e*, 132*f*, 132*g*, 132*h*, 132*i*, 132*j*, and 132*k*. These data items may be associated with different subjects. Thus, as illustrated in FIG. 1, subject data 120*a* includes data item 132*a*, subject data 140*a* includes data items 132*b*, 132*c*, and 132*d*, subject data 120*d* includes data items 132*e*, 132*f* and 132*g*, and subject data 140*b* includes data items 132*h*, 132*i*, 132*j*, and 132*k*.

One (or both) of training data sets 110 and 130 may be used as part of machine learning model training 150 (e.g., as part of various systems discussed below with regard to FIGS. 2 and 3). Moreover, as discussed in detail below, hierarchical gradient averaging may be implemented as privacy enforcement 152 that may be performed as part of machine learning model training 150.

To protect a subject's data privacy, various techniques for enforcing subject level privacy may be implemented, in various embodiments, such as the techniques for hierarchical gradient averaging discussed in detail below. Subject level privacy may be enforced for scenarios where a subject is an individual (or other sub-entity) whose private data can be spread across multiple data items across one or more training data sets (e.g., at a machine learning model trained for one user or across multiple different users in a federated machine learning scenario).

Federated learning allows multiple parties to collaboratively train a machine learning model while keeping the training data decentralized. Federated learning was originally introduced for mobile devices, with a core motivation of protecting data privacy. In a cross-device setting (e.g., across mobile devices), privacy is usually defined at two granularities: first, item-level privacy, which describes the protection of individual data items and user-level privacy, which describes the protection of the entire data distribution of the device user.

Subject level differential privacy may be enforced using differential privacy, in various embodiments. Such techniques in federated learning embodiments may assume a conservative trust model between the federation server and its users; the users do not trust the federation server (or other users) and enforce the subject level differential privacy locally.

In various embodiments, differential privacy may bound the maximum impact a single data item can have on the output of a randomized algorithm, $\mathcal{A}$. Thus, differential privacy may be described where randomized algorithm $\mathcal{A}$: $\mathcal{D} \to \mathcal{R}$ is said to be $(\epsilon, \delta)$ differentially private if for any two adjacent data sets D, D'$\in \mathcal{D}$, and set R$\subseteq \mathcal{R}$, $\mathcal{P}(\mathcal{A}(D) \in R) \leq e^{\epsilon}(\mathcal{P}(\mathcal{A}(D') \in R) + \delta$ (equation 1) where D, D' are adjacent to each other if they differ from each other by a single data item. δ is the probability of failure to enforce the ε privacy loss bound. The above description may provide item level privacy.

Differential privacy may be described differently in other scenarios, such as federated learning. Let $\mathcal{U}$ be the set of n users participating in a federation, and $\mathcal{D}_i$ be the data set of user $u_i \in \mathcal{U}$. Let $\mathcal{D}_{\mathcal{U}} = U_{i=1}^n \mathcal{D}_i$. Let $\mathcal{M}$ be the domain of models resulting from the federated learning training process. Given a federated learning training a $\mathcal{F}: \mathcal{D}_{\mathcal{U}} \to \mathcal{M}$, $\mathcal{F}$ is a user level (ε, δ) differentially private if for any two adjacent user sets U, U'⊆$\mathcal{U}$, and set R⊆$\mathcal{M}$, $\mathcal{P}(\mathcal{F}(\mathcal{D}_U) \in R) \leq e^\epsilon (\mathcal{P}(\mathcal{F}(\mathcal{D}_{U'}) \in R) + \delta$ (equation 2) where U, U' are adjacent user sets differing by a single user.

Let S be the set of subjects whose data is hosted by the federation's users $\mathcal{U}$. A description of subject level differential privacy may be, in some embodiments, based on the observation that even though the data individual subjects s∈S may be physically scattered across multiple users in $\mathcal{U}$, the aggregate data across $\mathcal{U}$ can be logically divided in to its subjects in S (e.g., $\mathcal{D}_{\mathcal{U}} = U_{s \in S} \mathcal{D}_s$). Given a federated learning training algorithm $\mathcal{F}: \mathcal{D}_{\mathcal{U}} \to \mathcal{M}$, where is a subject level (ε, δ) differentially private if for any two adjacent subject sets S, S'⊆$\mathcal{S}$ and R⊆$\mathcal{M}$, $\mathcal{P}(\mathcal{F}(\mathcal{D}_S) \in R) \leq e^\epsilon (\mathcal{P}(\mathcal{F}(\mathcal{D}_{S'}) \in R) + \delta$ (equation 3) where S and S' are adjacent subject sets if they differ from each other by a single subject. This description may ignore the notion of users in a federation. This user obliviousness allows for subject level privacy to be enforced in different scenarios, such as a single data set scenario (e.g., either training a model with multiple subjects but not in a federated learning scenario or in a federated learning scenario in which a subject's data items are located in a single user (e.g., a single device)) or a federated learning scenario where a subject's data items are spread across multiple users (e.g., a for a cross-silo federated learning setting).

The following description provides for various features of implementing techniques, such as hierarchical gradient averaging in federated learning scenarios. The federated learning server may be responsible for initialization and distribution of the model architecture to the federation users, coordination of training rounds, aggregation and application of model updates coming different users in each training round, and redistribution of the updated model back to the users. Federated users may receive updated models from the federation server, retraining the received models using its private training data, and returning updated model parameters to the federation server.

It may be assumed in some federated learning scenarios that the federation users and the federation server behave as honest-but-curious participants in the federation: they do not interfere with or manipulate the distributed training process in any way, but may be interested in analyzing received model updates. Federation users do not trust each other or the federation server, and may locally enforce privacy guarantees for their private data.

In the techniques described below, subject level differential privacy may be enforced locally at each user. But to prove the privacy guarantee for any subject across the entire federation, the federation server may ensure that the local subject level differential privacy guarantee composes correctly through global aggregation of parameter updates received from the users. Therefore, a federated training round may be divided into two functions, $\mathcal{F}_1$, the user's training algorithm that enforces subject level differential privacy locally, and $\mathcal{F}_g$ that simply averages parameter updates (at the federation server) composes the subject level differential privacy guarantee across multiple users in the federation. Therefore, it can be shown how an instance of $\mathcal{F}_g$ that simply averages parameter updates (at the federation server) composes the subject level differential privacy guarantee across multiple users in the federation.

In some embodiments, federation server techniques may include the federation server sampling a random set of users for each training round and sending them a request to perform local training. Each federated user may train for several mini-batches, even multiple epochs, and introduce noise (e.g., Gaussian noise in parameter gradients computed for each mini-batch). For each mini-batch, gradients are computed for each data item separately, and clipped to the threshold C to bound the gradients' sensitivity (e.g., maximum influence of any data item on the computed gradients). The gradients may then be summed over the full mini-batch, and noise scaled to C is added to the sum. This sum may then be averaged over the mini-batch size, and applied to the parameters.

In some embodiments, the parameter update at step t in can be described as:

$$\Theta_t = \Theta_{t-1} + \eta \nabla \mathcal{L}^C(\Theta_{t-1}) + \mathcal{N}(0, C^2, \sigma^2) \quad \text{(equation 4)}$$

where, $\nabla \mathcal{L}^C$ is the loss function's gradient clipped by the threshold C, σ is the noise scale calculated using the moments accountant method, $\mathcal{N}$ is the Gaussian distribution used to calculate noise, and η is the learning rate.

In some embodiments, the users send back updated model parameters to the federation server, which then averages the updates received from all the sampled users. The server redistributes the updated model and triggers another training round if needed.

One consideration for enforcing subject level differential privacy is that to guarantee subject level differential privacy, a training algorithm may have to obfuscate the entire contribution made by any subject in the model's parameter updates. In various embodiments, hierarchical gradient averaging techniques for enforcing subject level differential privacy may scale noise down to each subject's mini-batch gradient contribution to the clipping threshold C. This technique may be performed using the following steps, as discussed in detail below. Data items may be collected that belong to a common subject, gradients may be computed and clipped using the threshold C for each individual data item of the subject, and then those clipped gradients may be averaged (e.g., denoted $g(S_a^S)$). Clipping and then averaging gradients may ensure that the entire subject's gradient contribution is bounded by C. Subsequently, the technique may then sum all the per-subject averaged gradients along with the noise scaled to clipping threshold C, which are then averaged over the mini-batch size B.

In some embodiments, the noise added to the averaged gradients may be Gaussian noise. The Gaussian noise scale σ is calculated independently at each user $u_i$ using standard parameters, the privacy budget ε, the failure probability δ, total number of mini-batches T. R. and the sampling fraction per mini-batch $$\frac{B}{|D_i|}.$$

The calculation may use the moments accountant method to compute σ.

In some embodiments, subject sensitivity may be described as follows. Given a model $\mathcal{M}$, and a sampled mini-batch of training data S, subject sensitivity may be specified as $\mathbb{S}^S$ for S as the maximum difference caused by an single subject $\alpha \in$ subjects(S) in $\mathcal{M}$'s parameter gradients computed over S. For every sampled mini-batch S in a samples user $u_i$'s training round, the subject sensitivity $\mathbb{S}^S$ for S is bounded by C (e.g., $\mathbb{S}^S \leq |C|$). This technique locally enforces ($\varepsilon$, $\delta$) differential privacy.

The following pseudo code provides an example implementation of hierarchical gradient averaging with differential privacy (referred to below as HiGradAvgDP). In the following pseudo code, parameters may be described as follows:

```
Set of n users 𝒰 = u₁, u₂, ... , uₙ
𝒟ᵢ, the data set of user uᵢ
M, the model to be trained
Θ, the parameters of model M
C, gradient norm bound
σ, sample of users Uₛ
B, mini-batch size
R, training rounds
T, batches per round
η, the learning rate
Sₐˢ the subset of data items from set S that have a as
   their subject
```

The user system training pseudo code for HiGradAvgDP ($u_i$):

```
for t = 1 to T do
   S = random sample of B data items from 𝒟ᵢ
   for a ∈ subjects(S) do
      for sᵢ ∈ Sₐˢ do
         Compute gradients:
         g(sᵢ) = ∇ℒ(θ, sᵢ)
         Clip gradients:
         ḡ(sᵢ) = Clip(g(sᵢ), C)
      end
      Average subject a's gradients:
```

$$g(S_a^s) = \frac{1}{|S_a^S|}(\Sigma_i \bar{g}(s_i))$$

```
   end
```

$$\tilde{g} = \frac{1}{B}\left(\Sigma_{a \in subjects(S)} g(S_a^S) + \mathcal{N}(0, \sigma^2 C^2 I)\right)$$

```
   Θ = Θ − ηḡs
end
return M
```

The federated server system training pseudo code:

```
for r = 1 to R do
   Uₛ = sample s users from 𝒰
   for uᵢ ∈ Uₛ do
      Θᵢ = HiGradAvgDP(uᵢ)
   end
```

$$\Theta = \frac{1}{s}\sum_i \Theta_i$$

```
   Send M to all users in 𝒰
end
```

At the beginning of a training round, each sampled user receives a copy of the global model, with parameters $\Theta_0$, which it then retrains using its private data. Since all sampled users start retraining from the same model $\mathcal{M}_{\Theta_0}$, and independently retrain the model using their respective private data, parallel composition of privacy loss across these sampled users may seem to apply naturally. In that case, the aggregate privacy loss incurred across multiple federation users, via aggregation $\mathcal{F}_g$, remains identical to the privacy loss $\varepsilon$ incurred individually at each user. However, parallel composition was proposed for item level privacy, where an item belongs to at most one participant. With subject level privacy, a subject's data items can span across multiple users, which limits application of parallel privacy loss composition to only those federations where each subject's data is restricted to at most one federation user. In the more general case, it may be shown that subject level privacy loss composes sequentially via the federated averaging aggregation algorithm used in the described federated learning training algorithms.

Consider a federated learning training algorithm $\mathcal{F} = (\mathcal{F}_l, \mathcal{F}_g)$ where $\mathcal{F}_l$ is a local user component, and $\mathcal{F}_g$ is a global aggregation component of $\mathcal{F}$. Given a federation user $u_i$, let $\mathcal{F}_l: (\mathcal{M}, \mathcal{D}_{u_i}) \to P_{u_i}$, where $\mathcal{M}$ is a model, $\mathcal{D}_{u_i}$ is the private data set of user $u_i$, and $P_{u_i}$ is the updated parameters produced by $\mathcal{F}_l$. Let $$\mathcal{F}_g = \frac{1}{n}\sum_i P_{u_i},$$

a parameter update averaging algorithm over a set of n federation users $u_i$. Given a federated learning training algorithm $\mathcal{F} = (\mathcal{F}_l, \mathcal{F}_g)$ in the most general case where a subject's data resides in the private data sets of multiple federation users $u_i$, the aggregation algorithm $\mathcal{F}_g$, sequentially composes subject level privacy losses incurred by $\mathcal{F}_l$ at each federation user.

This sequential composition of privacy loss across federation users may be referred to as "horizontal composition." Horizontal composition may have a significant effect on the number of federated training rounds permitted under a given privacy loss budget. Consider a federated learning training algorithm $\mathcal{F} = (\mathcal{F}_l, \mathcal{F}_g)$ that samples s users per training round, and trains the model $\mathcal{M}$ for R rounds. Let $\mathcal{F}_l$ at each participating user, over the aggregate of R training rounds, locally enforce subject-level ($\varepsilon$, $\delta$) differential privacy. Then $\mathcal{F}$ globally enforces the same subject-level ($\varepsilon$, $\delta$) differential privacy guarantee by training for $$\frac{R}{\sqrt{s}}$$

rounds.

The s-way horizontal composition via $\mathcal{F}_g$ results in an increase in training mini-batches by a factor of s. As a result, the privacy loss calculated by the moments accountant method amplifies by a factor of $\sqrt{s}$, thereby forcing a reduction in number of training rounds by a factor of $\sqrt{s}$ to counteract the inflation of privacy loss. This reduction in training rounds can have a significant impact on the resulting model's performance. Note that similar compensation for privacy loss amplification caused by horizontal composition can also be enforced by reducing the user sampling fraction by a factor of $\sqrt{s}$.

The specification next discusses example implementations of a machine learning systems that can implement the above hierarchical gradient techniques to enforce subject level privacy. Then, various exemplary flowcharts illustrating methods and techniques, which may be implemented by these machine learning systems or other systems or applications are discussed. Finally, an example computing system is discussed upon which various embodiments may be implemented is discussed.

Figure 2:
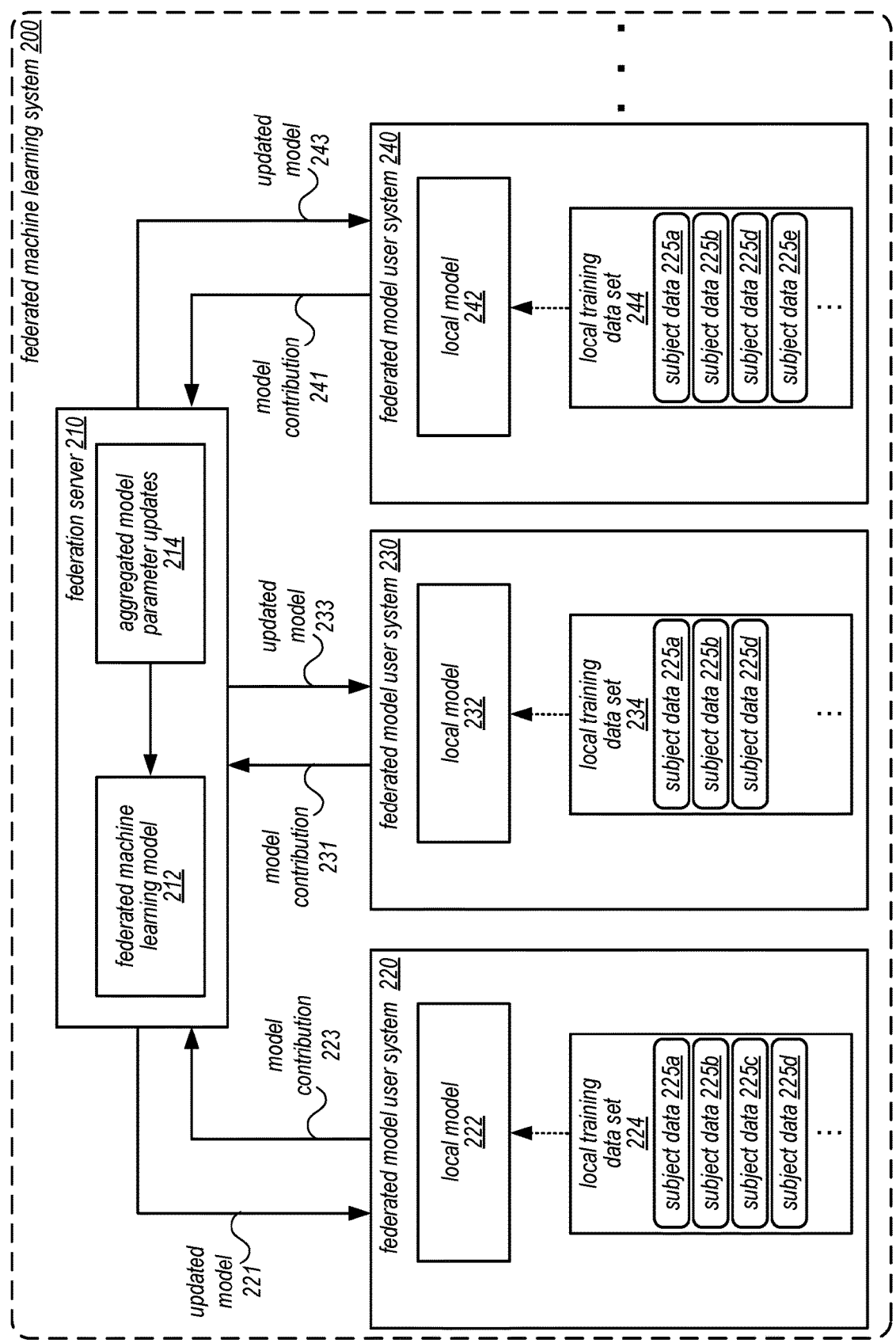
FIG. 2 is a logical block diagram illustrating a federated machine learning system that implements hierarchical gradient averaging for enforcing subject-level privacy for training federated machine learning models, according to some embodiments.

FIG. 2 is a logical block diagram illustrating a federated machine learning system that implements hierarchical gradient averaging for enforcing subject-level privacy for training federated machine learning models, according to some embodiments. A federated machine learning system 200 may include a central aggregation server, such as federated server 210 and multiple federation model user systems 220, 230, and 240 that may employ local machine learning systems, in various embodiments. The respective federation server 210 and federated model user systems 220, 230 and 240 may be implemented, for example, by computer systems 1000 (or other electronic devices) as shown below in FIG. 6. The federation server 210 may maintain a federated machine learning model 212 and, to perform training, may distribute a current version of the machine learning model 212 to the federated model user systems 220, 230, and 240 (as indicated by respective updated models 221, 233, and 243). For example, as discussed above, and in detail below with regard to FIG. 5, federation server 210 may send the parameters of an updated model to federated model user systems after determining that another training round for the federated machine learning model 212 is to be performed.

After receiving a current version of the machine learning model 212, individual ones of the federated model user systems 220, 230 and 240, may independently generate locally updated versions of the machine learning models 222, 232, and 242 by training the model using local, training data sets 224, 234, and 244. Individual ones of the federated model user systems 220, 230, and 240 may independently alter, by clipping and applying noise, to their local model parameter updates to generate modified model parameter updates, where the altering provides or ensures privacy of their local training data sets 224, 234, and 244, in some embodiments.

For example, as discussed in detail above and below with regard to FIG. 4, hierarchical gradient averaging may be performed to enforce subject level privacy for subject data 225 across the different local training data sets 224, 234, and 244. Features of the technique, as discussed, may include identifying a sample of data items from data sets 224, 234, and 244 (e.g., as a mini-batch), determining respective gradients for individual data items in the sample of data items, clipping the respective gradients according to a threshold, averaging the clipped gradients of data items of a subject for each subject, adding a noise value to a sum of the averaged gradients of the subjects, and determining a sample average gradient for the sample of data items from the sum of the averaged gradients with the added noise divided by a number of data items in the sample. This independently performed training may then generate model parameter updates that provide respective model contributions 223, 233, and 243 to federation server 210.

Upon receipt of the collective modified model parameter updates, the federation server 210 may then aggregate the respective modified model parameter updates to generate aggregated model parameter updates 214. For example, as discussed above and below with regard to FIG. 5, averaging of parameter updates may be performed to determine the aggregated model parameter updates. The federation server 210 may then apply the aggregated model parameter updates 214 to the current version of the federated machine learning model 212 to generate a new version of the model 212. This process may be repeated a number of times until the model 212 converges or until a predetermined threshold number of iterations is met.

FIG. 2 illustrates an example of scenarios where a subject's data can be included in the local training data sets of different users. For example, local training data set 224 includes subject data 225a, 225b, 225c, and 225d for federated model user 220. For federated model user 230, local training data set 234 may include some of the same subjects (e.g., subject data 225a, 225b, and 225d). For federated model user 240, local training data set 244 may include some of the same subjects (e.g., subject data 225a, 225b, 225d, and 225e).

In other embodiments, not illustrated, a federated learning scenario where a subject's data is only found in a single user (e.g., cross-device federated learning). Similar techniques for performing hierarchical gradient averaging for enforcing subject level privacy may still be performed as part of user training in such embodiments. Thus, the illustrated example is not intended to be limiting.

Figure 3:
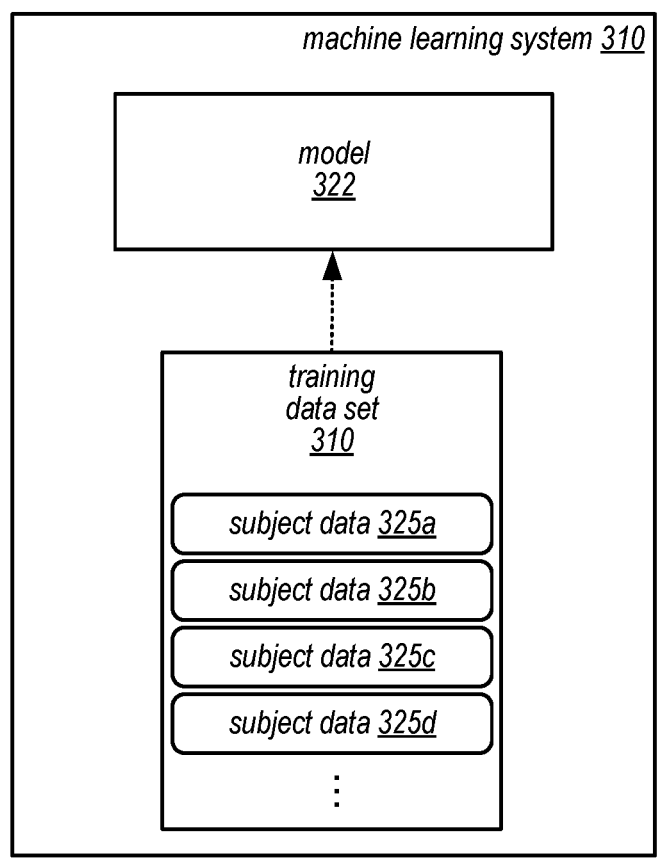
FIG. 3 is a logical block diagram illustrating a non-federated machine learning system that implements hierarchical gradient averaging for enforcing subject-level privacy for training non-federated machine learning models, according to some embodiments.

FIG. 3 is a logical block diagram illustrating a non-federated machine learning system that implements hierarchical gradient averaging for enforcing subject-level privacy for training non-federated machine learning models, according to some embodiments. Like the federated model user systems discussed above with regard to FIG. 2, machine learning system 310 may train a machine learning model 322 with training data asset 310. Even in the non-federated scenario illustrated in FIG. 3, it may be desirable to enforce subject-level privacy. For example, training data set 310 may have multiple different subject's data 325a, 325b, 325c, and 325d, which may not be adequately protected using item level privacy.

Therefore, machine learning system 310 may implement hierarchical gradient averaging as discussed in detail above and below with regard to FIG. 4. Hierarchical gradient averaging may be performed to enforce subject level privacy for subject data 325a, 325b, 325c, and 325d in the training data set 310. Features of the technique, as discussed, may include identifying a sample of data items from data set 310 (e.g., as a mini-batch), determining respective gradients for individual data items in the sample of data items, averaging the clipped gradients of data items of a subject for each subject, adding a noise value to a sum of the averaged gradients of the subjects, and determining a sample average gradient for the sample of data items from the sum of the averaged gradients with the added noise divided by a number of data items in the sample. This technique may be performed for a number of training rounds (e.g., determined according to a privacy budget as discussed below with regard to FIG. 5).

Various different systems, services, or applications may implement the techniques discussed above. For example, FIG. 6, discussed below, provides an example computing system that may implement various ones of the techniques discussed above. FIG. 4 is a high-level flowchart illustrating techniques to hierarchical gradient averaging for enforcing subject-level privacy for training machine learning models, according to some embodiments. These techniques may be implemented on systems similar to those discussed above with regard to FIGS. 2-3 as well as other machine learning systems, services, or platforms, or those that incorporate machine learning techniques.

As indicated at 410, a machine learning model may be trained using gradient descent on a data set including multiple subjects, in some embodiments. The multiple subjects may have one (or more) data items in the data set. For example, as discussed above with regard to FIG. 1, a training data set may have multiple data items. Each data item may be associated with a subject (which may be indicated in the data item, such as a field or attribute of the data item), and there may be multiple subjects in a training data set. The training of the machine learning model may be performed as part of a federated learning training system, where the training is performed by a user and where the data set is a private data set that is not shared with other users in the federated learning system.

In various embodiments, different types of machine learning models may be trained including various types of neural network-based machine learning models. Various types of gradient descent training techniques may be implemented, such as batch gradient descent, stochastic gradient descent, or mini-batch gradient descent. Gradient descent training techniques may be implemented to minimize a cost function (e.g., a difference between a predicted value or inference of the machine learning model given an input from a training data set and an actual value for the input) according to a gradient and a learning rate (e.g., a "step size" or $\alpha$).

As part of training a machine learning model, hierarchical gradient averaging techniques may be performed. Hierarchical gradient averaging may be performed as part of different training rounds. As discussed according to the examples above, for mini-batch gradient descent, hierarchical gradient averaging may be performed for multiple different mini-batches in a training round.

As indicated at 420, a sample of data items from the data set may be identified, in some embodiments. For example, various different random sampling techniques (e.g., using random number generation) may be implemented to select the sample of data items. The sample of data items may be less than the entire number of data items from the data set, in some embodiments. In this way, different samples taken for different iterations of the technique performed in a training round (e.g., for different mini-batches) may likely have at least some data items that are different from a prior sample.

As indicated at 430, respective gradients for individual data items in the sample of data items may be determined, in some embodiments. For example, partial derivatives of a given function may be taken with respect to the different machine learning model parameters for a given input value of an individual data item. As indicated at 440, the respective gradients for the individual data items in the sample of data items may be clipped according to a threshold. As discussed above, a clipping threshold (e.g., C) may be applied. This clipping threshold may be applied so that the respective gradients for the individual data items are scaled to be no larger than the clipping threshold. The clipping threshold may be determined in various ways (e.g., by using early training rounds to determine an average value of gradient norms) and specified as a hyperparameter for training (e.g., a federated user machine learning system). As indicated at 450, the clipped gradients of individual ones of the subjects may be averaged with the individual data items in the sample of data items, in some embodiments.

As indicated at 460, a noise value may be added to a sum of the averaged gradients for the individual ones of the subjects, in some embodiments. For example, as discussed above the noise value may be a Gaussian noise scale. In a federated learning scenario, the noise value may be calculated independently for each user (e.g., where the added noise for user X is different than the added noise for user Y).

As indicated at 470, a sample average gradient for the sample of data items may be determined from a sum of the noisy averaged gradients with the added noise value divided by a number of items in the sample of data items, in some embodiments. For example, the number of items in the sample may be the size of the mini-batch (e.g. B as discussed above). This sample average gradient may then be used as the gradient for determining parameter adjustments for those data items in the sample.

Figure 4:
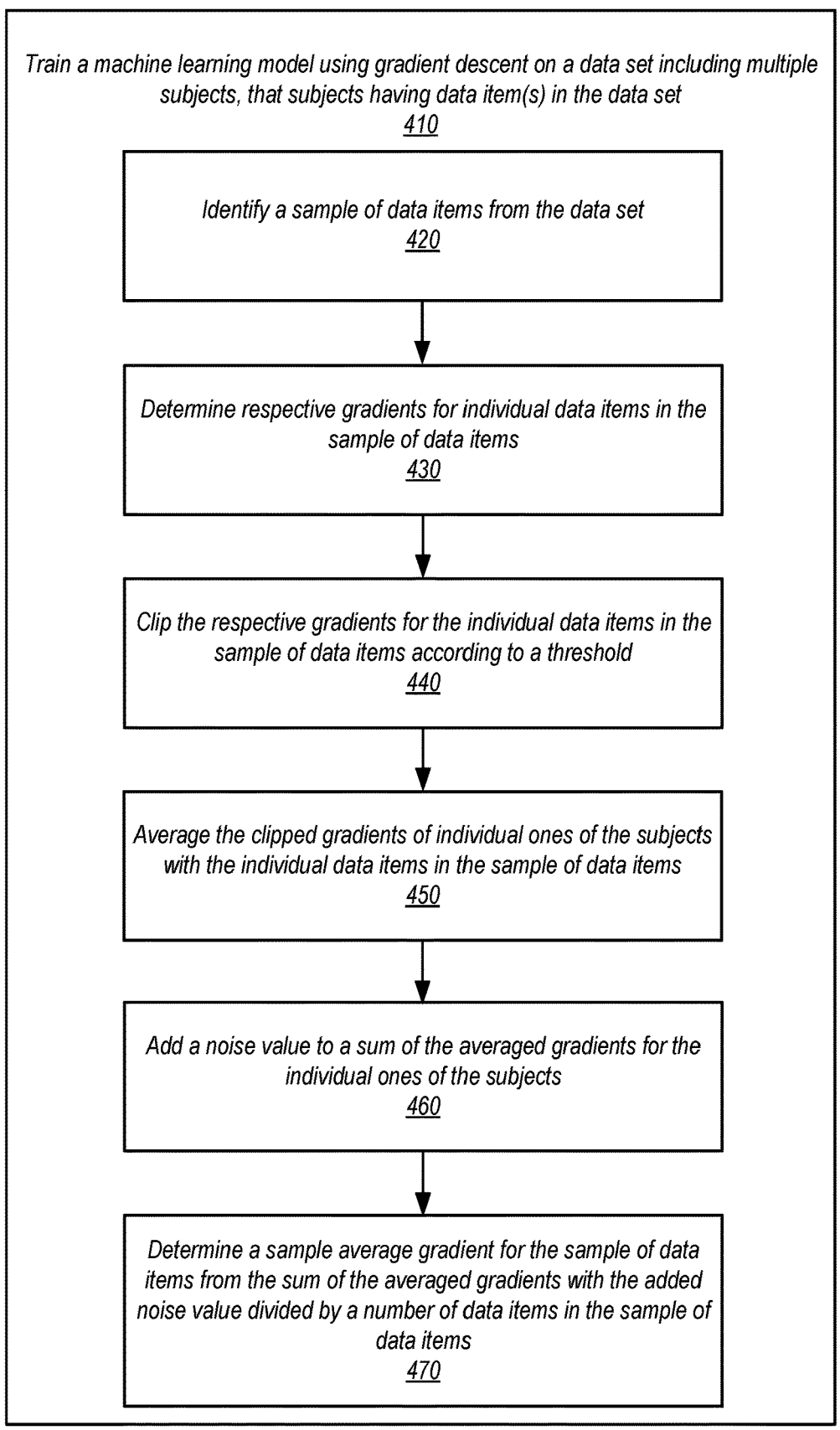
FIG. 4 is a high-level flowchart illustrating techniques to hierarchical gradient averaging for enforcing subject-level privacy for training machine learning models, according to some embodiments.
Figure 5:
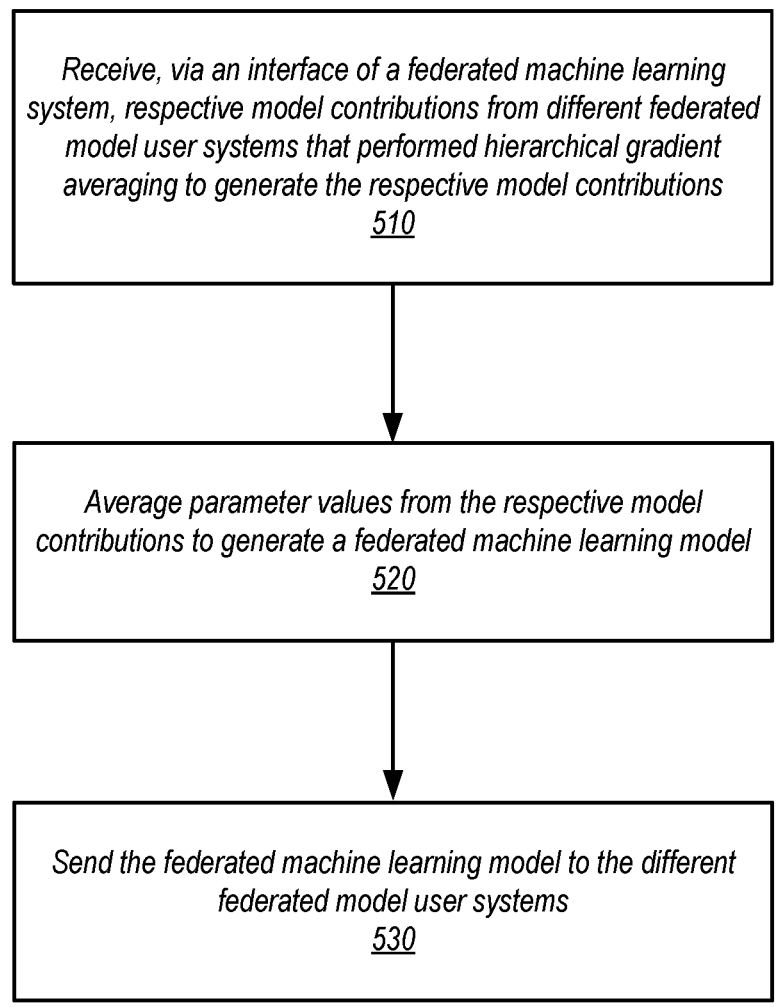
FIG. 5 is a high-level flowchart illustrating techniques to implement averaging model parameters generated using hierarchical gradient averaging for enforcing subject-level privacy for training machine learning models, according to some embodiments.

As discussed above, after completing a training round, performing one (or more) iterations of hierarchical gradient averaging as discussed with regard to FIG. 4, the updated machine learning model may be returned to a federation server, in those embodiments in which hierarchical gradient averaging differential privacy is used to enforce subject level privacy in a federated machine learning system. FIG. 5 is a high-level flowchart illustrating techniques to implement averaging model parameters generated using hierarchical gradient averaging for enforcing subject-level privacy for training machine learning models, according to some embodiments.

As indicated at 510, respective model contributions may be received from different federated model user systems that performed hierarchical gradient averaging, according to the techniques discussed above with regard to FIG. 4, to generate the respective model contributions, in some embodiments. For example, as discussed above with regard to FIG. 2, a federated machine learning server (or other central, coordinating system) may interact with different federated machine learning user systems which may receive instructions and/or the machine learning model training at respective user systems using private data sets.

As indicated at 520, parameter values from the respective model contributions may be averaged to generate a federated machine learning model, in some embodiments. For example, the average may be, in some embodiments, a simple average of parameter updates from each federated user system, wherein the parameter updates are averaged equally. Other averaging techniques may be implemented in other embodiments.

If more training rounds are to be performed, then, as indicated at 530, the federated machine learning model may be sent to the different federated model user systems, in some embodiments. The number of training rounds may be determined, in some embodiments, based on a privacy budget where the privacy budget may be divided amongst the number of users which may be used to the total number of training rounds before exceeding the privacy budget (e.g., by X portion of the budget per training round, Y number of users, where $$\text{number of training rounds} = \frac{\text{training budget}}{X \times Y}.$$

The techniques described above and with respect to FIG. 5 may performed until the determined number of training rounds have been performed, in some embodiments.

Figure 6:
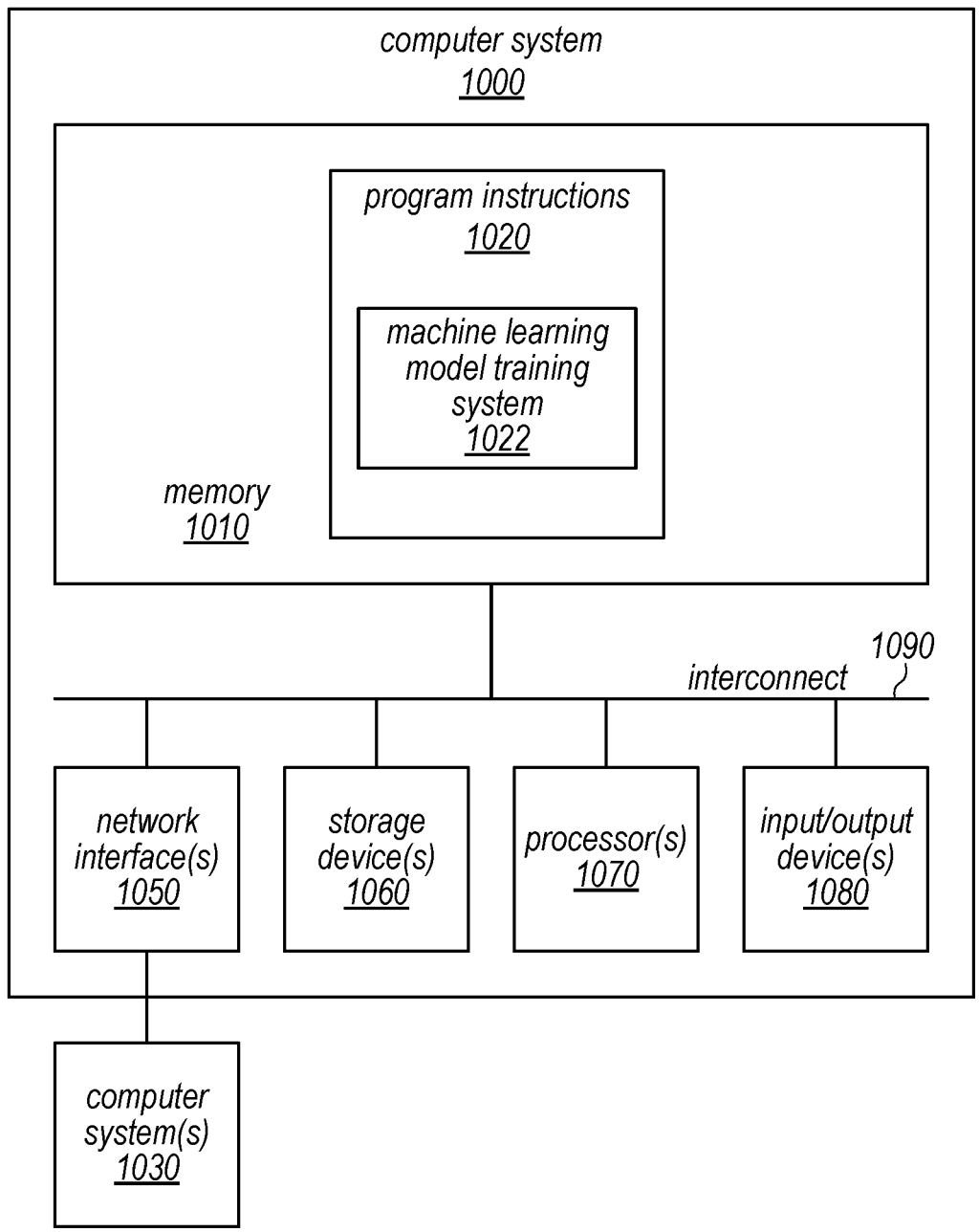
FIG. 6 illustrates an example computing system, according to some embodiments.

FIG. 6 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing subject level privacy attack analysis for federated learning, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a machine learning model training system 1022 as discussed above with regard to FIGS. 1-5 that may perform the various training and application of re-ranking models, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
   at least one processor;
   a memory, comprising program instructions that when executed by the at least one processor cause the at least one processor to implement a machine learning system, the machine learning system configured to:
   train a machine learning model using gradient descent on a data set comprising a plurality of subjects, wherein individual ones of the plurality of subjects comprise one or more data items, and wherein to train the machine learning model, the machine learning system is configured to:
   identify a sample of data items from the data set;
   determine respective gradients for individual data items in the sample of data items;
   clip the respective gradients for the individual data items in the sample of data items according to a threshold;
   average the clipped gradients of individual ones of the subjects with the individual data items in the sample of data items;
   add a noise value to a sum of the averaged gradients for the individual ones of the subjects; and
   determine a sample average gradient for the sample of data items from the sum of the noisy averaged gradients with the added noise value divided by a number of data items in the sample of data items.

2. The system of claim 1, wherein the identification of the sample of data items, the determination of the respective gradients, the clip of the respective gradients, the average of the clipped gradients, the addition of the noise value, and the determination of the sample average gradient for the sample of data items is performed as part of one training round, and wherein a number of other training rounds in addition to the one training round are performed as determined according to a privacy budget.

3. The system of claim 1, wherein the noise is Gaussian noise determined for the machine learning system.

4. The system of claim 1, wherein the sample is one of a plurality of mini-batches taken from the data set as part of the training, and wherein the identification of the sample of data items, the determination of the respective gradients, the clip of the respective gradients, the average of the clipped gradients, the addition of the noise value, and the determination of the sample average gradient for the sample of data items are performed for other ones of the plurality of mini-batches.

5. The system of claim 1, wherein the machine learning model is a non-federated machine learning model.

6. The system of claim 1, wherein the machine learning system is a federated model user system, and machine learning system is further configured to:
   receive the machine learning model from a federation server; and
   return parameter updates to the machine learning model determined from performing the training to the federation server.

7. The system of claim 6, wherein the federated model user system is one of a plurality of federated model user systems that received the machine learning model from the federation server, and wherein the data set is one of a plurality of data sets respectively used at the plurality of federated model user systems, wherein at least one of the plurality of subjects has an associated data item at a different one of the plurality of data sets used at a different one of the plurality of federated mode user systems.

8. A computer-implemented method, comprising:
   training a machine learning model using gradient descent on a data set comprising a plurality of subjects, wherein individual ones of the plurality of subjects comprise one or more data items, and wherein the training comprises:
   identifying a sample of data items from the data set;
   determining respective gradients for individual data items in the sample of data items;
   clipping the respective gradients for the individual data items in the sample of data items according to a threshold;
   averaging the clipped gradients of individual ones of the subjects with the individual data items in the sample of data items;
   adding a noise value to a sum of the averaged gradients for the individual ones of the subjects; and
   determining a sample average gradient for the sample of data items from the sum of the noisy averaged gradients with the added noise value divided by a number of data items in the sample of data items.

9. The computer-implemented method of claim 8, wherein the identifying the sample of data items, the determining the respective gradients, the clipping the respective gradients, the averaging the clipped gradients, the adding the noise value, and the determining the sample average gradient for the sample of data items is performed as part of one training round, and wherein a number of other training rounds are performed in addition to the one training round as determined according to a privacy budget.

10. The computer-implemented method of claim 8, wherein the noise is Gaussian noise determined for a machine learning system performing the training.

11. The computer-implemented method of claim 8, wherein the sample is one of a plurality of mini-batches taken from the data set as part of the training, and wherein the identifying the sample of data items, the determining the respective gradients, the clipping the respective gradients, the averaging the clipped gradients, the adding the noise value, and the determining the sample average gradient for the sample of data items are performed for other ones of the plurality of mini-batches.

12. The computer-implemented method of claim 8, wherein the computer-implemented method is performed by a federated model user system and wherein the method further comprises:
   receiving the machine learning model from a federation server; and
   returning parameter updates to the machine learning model determined from performing the training to the federation server.

13. The computer-implemented method of claim 12, wherein the federated model user system is one of a plurality of federated model user systems that received the machine learning model from the federation server, and wherein the data set is one of a plurality of data sets respectively used at the plurality of federated model user systems, wherein at least one of the plurality of subjects has an associated data item at a different one of the plurality of data sets used at a different one of the plurality of federated mode user systems.

14. The computer-implemented method of claim 8, wherein the machine learning model is a non-federated machine learning model.

15. One or more non-transitory, computer-readable storage media, storing program instructions that when executed on or across one or more computing devices, cause the one or more computing devices to implement:
  training a machine learning model using gradient descent on a data set comprising a plurality of subjects, wherein individual ones of the plurality of subjects comprise one or more data items, and wherein, in training the machine learning model, the program instructions cause the one or more computing devices to implement:
    identifying a sample of data items from the data set;
    determining respective gradients for individual data items in the sample of data items;
    clipping the respective gradients for the individual data items in the sample of data items according to a threshold;
    averaging the clipped gradients of individual ones of the subjects with the individual data items in the sample of data items;
    adding a noise value to a sum of the averaged gradients for the individual ones of the subjects; and
    determining a sample average gradient for the sample of data items from the sum of the noisy averaged gradients with the added noise value divided by a number of data items in the sample of data items.

16. The one or more non-transitory, computer-readable storage media of claim 15, wherein the identifying the sample of data items, the determining the respective gradients, the clipping the respective gradients, the averaging the clipped gradients, the adding the noise value, and the determining the sample average gradient for the sample of data items is performed as part of one training round, and wherein a number of other training rounds are performed in addition to the one training round as determined according to a privacy budget.

17. The one or more non-transitory, computer-readable storage media of claim 15, wherein the noise is Gaussian noise determined for a machine learning system performing the training.

18. The one or more non-transitory, computer-readable storage media of claim 15, wherein the sample is one of a plurality of mini-batches taken from the data set as part of the training, and wherein the identifying the sample of data items, the determining the respective gradients, the clipping the respective gradients, the averaging the clipped gradients, the adding the noise value, and the determining the sample average gradient for the sample of data items are performed for other ones of the plurality of mini-batches.

19. The one or more non-transitory, computer-readable storage media of claim 15, wherein the one or more computing devices implement a federated model user system, and wherein the one or more non-transitory, computer readable storage media store further instructions that when executed on or across the one or more computing devices, cause the one or more computing devices to further implement:
  receiving the machine learning model from a federation server; and
  returning parameter updates to the machine learning model determined from performing the training to the federation server.

20. The one or more non-transitory, computer-readable storage media of claim 19, wherein the federated model user system is one of a plurality of federated model user systems that received the machine learning model from the federation server, and wherein the data set is one of a plurality of data sets respectively used at the plurality of federated model user systems, wherein at least one of the plurality of subjects has an associated data item at a different one of the plurality of data sets used at a different one of the plurality of federated mode user systems.

* * * * *